United States Patent
Era (10) Patent No.: US 7,660,432 B2
(45) Date of Patent: Feb. 9, 2010

(54) METHOD FOR CONTROLLING CREATION OF STEREOSCOPIC IMAGE

(76) Inventor: Kazunari Era, 4-1-11-201, Matsuba-cho, Kashiwa-shi, Chiba 277-0827 (JP)

( * ) Notice: Subject to any disclaimer, the term of this patent is extended or adjusted under 35 U.S.C. 154(b) by 539 days.

(21) Appl. No.: 11/208,791

(22) Filed: Aug. 23, 2005

(65) Prior Publication Data

US 2006/0088186 A1    Apr. 27, 2006

Related U.S. Application Data

(60) Provisional application No. 60/620,318, filed on Oct. 21, 2004.

(51) Int. Cl.
*G06K 9/00* (2006.01)
(52) U.S. Cl. ...................................... 382/100
(58) Field of Classification Search ................ 382/154, 382/100; 345/419, 420, 421, 422, 423, 424, 345/425, 426, 427; 356/12, 13, 14; 348/61–70
See application file for complete search history.

(56) References Cited

U.S. PATENT DOCUMENTS 6,366,691 B1 * 4/2002 Sogawa .................. 382/154
6,552,722 B1 * 4/2003 Shih et al. ................ 345/419
2001/0043739 A1 * 11/2001 Oshino et al. ............ 382/154
2003/0043262 A1 * 3/2003 Takemoto et al. .......... 348/46
2004/0247175 A1 * 12/2004 Takano et al. ............ 382/154

FOREIGN PATENT DOCUMENTS

| JP | A-10-164549 | 6/1998 |
| JP | A-2002-123842 | 4/2002 |

* cited by examiner

*Primary Examiner*—Samir A. Ahmed
*Assistant Examiner*—Atiba O Fitzpatrick
(74) *Attorney, Agent, or Firm*—Oliff & Berridge, PLC (57) ABSTRACT

The target of stereoscopic processing for creating a stereoscopic image from an original image is restricted to specific original images. An authentication image creation device changes the pixel data of a target pixel within an original image into update data that are created from the pixel data of pixels adjacent to that target pixel. On the other hand, in advance of stereoscopic processing of the original image, an image processing device compares the pixel data of the target pixel in that original image with authentication data that are created from the pixel data of pixels adjacent to that target pixel, and based on the results of that comparison, determines whether or not stereoscopic processing of that original image is to be permitted.

16 Claims, 5 Drawing Sheets

METHOD FOR CONTROLLING CREATION OF STEREOSCOPIC IMAGE

This nonprovisional application claims the benefit of U.S. Provisional Application No. 60/620,318, filed Oct. 21, 2004. The entire disclosure of the prior application is incorporated herein by reference in its entirety.

BACKGROUND OF THE INVENTION

1. Field of the Invention

The present invention relates to technology for creating an image that is perceived by a user as a three-dimensional presentation (hereinafter, referred to as "stereoscopic image") from an image that is perceived as flat (hereinafter, referred to as "original image").

2. Description of Related Art

When a user views one of two images having parallax with his left eye and views the other with his right eye, it is possible for him to perceive that image as a three-dimensional presentation. Technologies for creating stereoscopic images having parallax from flat original images have been proposed in the past (for example, see JP 2002-123842A, paragraph 0034, FIG. 5). The function of creating stereoscopic images has been made available to users in the form of a program that is run on a computer (hereinafter, referred to as "stereoscopic presentation program").

However, this type of stereoscopic presentation program could conceivably be provided to users in a form stored on a various types of storage media along with original images that are to be converted into stereoscopic images (for example, moving images such as video and still images such as images of scenery). A user that has obtained this storage medium could not only view the original image as a flat image but also as a stereoscopic image obtained by executing the stereoscopic presentation program. Furthermore, from the perspective of the supplier of such storage mediums, it would be possible to distinguish that media from other storage media that store original images only, and thus this would give the supplier an additional avenue through which to promote sales of the storage media.

However, in the above situation there is the risk that the effort by the supplier to make their product unique may be undermined unless the original images to be processed by the stereoscopic presentation program can be restricted to specific original images. This is because if a user can obtain a stereoscopic presentation program once and subsequently obtain storage media storing only original images without having to specifically obtain storage media to which a stereoscopic presentation program has been added, he could use the stereoscopic presentation program that was obtained previously to convert those original images into stereoscopic images for viewing.

SUMMARY OF THE INVENTION

The present invention was arrived at in light of the foregoing matters, and provides a method of restricting the target of stereoscopic processing, which creates stereoscopic images from original images, to specific original images.

To address the above issues, an authentication image creation device according to the present invention is provided with a memory section that, for each of a plural number of pixels making up an original image, stores pixel data indicating a display color of that pixel, an update pixel obtaining section that obtains pixel data of at least one pixel selected according to a positional relationship between the at least one pixel and a target pixel in a specific location of the original image, an update data specifying section that specifies update data for an image processing device to compare against pixel data of pixels corresponding to the specific location of the original image based on the pixel data of the at least one pixel obtained by the update pixel obtaining section, in order to determine whether or not to allow stereoscopic processing for creating a stereoscopic image that includes multiple images having parallax from a target original image, and a data processing section that alters the pixel data of the target pixel stored on the memory means based on update data that have been specified by the update data specifying section.

An image processing device according to the invention is provided with a memory section that, for each of a plural number of pixels making up an original image, stores pixel data indicating a display color of that pixel, an authentication pixel obtaining section that obtains pixel data of a target pixel in a specific location of the original image, and pixel data of at least one pixel selected according to a positional relationship between the at least one pixel and that target pixel, an authentication data specifying section that specifies authentication data based on the pixel data of the at least one pixel obtained by the authentication pixel obtaining section, and a determination section that compares authentication data specified by the authentication data specifying section and the pixel data of the target pixel obtained by the authentication pixel obtaining section and based on the results of this comparison, determines whether or not to allow stereoscopic processing for creating a stereoscopic image that includes multiple images having parallax from the original image.

As above, the authentication image creation device according to the invention alters the pixel data of a target pixel in the original image based on update data. On the other hand, the image processing device according to the present invention determines whether or not to allow stereoscopic processing of an original image based on the results of comparing the pixel data of a target pixel in that original image with authentication data. For example, it is possible to allow stereoscopic processing by the image processing device for original images in which the pixel data of a target pixel has been changed by the authentication image creation device based on update data, but not allow stereoscopic processing by the image processing device for original images in which none of the pixel data have been changed into update data. In this way, it is thus possible to restrict the target of stereoscopic processing to specific original images.

However, depending on the content of the original image, there can be instances in which the pixel data of the target pixel before being changed by the data processing section will match the pixel data of the target pixel after processing by the data processing section. For this reason, it is preferable that multiple target pixels are handled in the authentication image creation device of the invention. That is, it is preferable that the authentication image creation device has a configuration in which the update pixel obtaining section obtains the pixel data of at least one pixel for each of multiple target pixels included in the original image, the update data specifying section specifies update data for each of the multiple target pixels, and the data processing section alters the pixel data of each of the multiple target pixels based on the update data obtained for that target pixel. For the same reason, it is preferable that multiple target pixels are handled in the image processing device of the invention. That is, it is preferable that the image processing device has a configuration in which the authentication pixel obtaining section obtains the pixel data of the at least one pixel for each one of multiple target pixels included in the original image, the authentication data specifying section specifies the authentication data for each one of the multiple target pixels, and for each of the target pixels, the determination section compares the pixel data of that target pixel with the authentication data that have been specified by the authentication data specifying section.

Because the pixel data are data that indicate the display color of the pixel, there is a noticeable effect on the quality of the original image when there is a large difference between the display color that is indicated by the pixel data prior to processing by the data processing section and the display color indicated by the pixel data after this processing. To avoid this, in the authentication image creation device of the invention it is preferable that the update pixel obtaining section obtains the pixel data of at least one pixel that is adjacent to the target pixel in the original image. In general it can be expected that the display color of pixels adjacent to a target pixel will be close to the display color of that target pixel, and therefore with this configuration it is possible to inhibit differences in the display color of the target pixel before and after processing by the data processing section. In particular, a configuration in which the update data specifying section specifies a mean value of numerical values included in the pixel data of at least one pixel obtained by the update pixel obtaining section as update data allows further inhibition of differences in the display color of the target pixel before and after processing by the data processing section. It is preferable for the image processing device of the invention to also have a configuration that corresponds to this configuration of the authentication image creation device, which is a configuration in which the authentication pixel obtaining means obtains the pixel data of at least one pixel that is adjacent to the target pixel in the original image, and a configuration in which the authentication data specifying section specifies a mean value of numerical values included in the pixel data of at least one pixel obtained by the update pixel obtaining section as authentication data.

It should be noted that the present invention can also be implemented in the form of a program for causing a computer to function as the authentication image creation device discussed above. Likewise, the present invention can also be implemented in the form of a program for causing a computer to function as the image processing device discussed above. These programs can be made available to a computer over a network or can be made available in a form stored on various types of storage media such as optical disks, magnetic disks, or magneto-optic disks, and then installed on a computer.

DETAILED DESCRIPTION OF THE INVENTION

Embodiments of the present invention are described below with reference to the drawings. In the embodiment described below, a supplier furnishes a user with a storage medium storing original images and a stereoscopic presentation program, and it assumes a case in which the original images that are stored on this storage medium are made available for viewing by the user after first being converted into stereoscopic images by the stereoscopic presentation program stored on that storage medium. Further, in this embodiment, a process for limiting the images that are to be converted into stereoscopic images by the stereoscopic presentation program to the original images that are stored on that storage medium (hereinafter, referred to as "stereoscopic restriction process") is performed before the storage medium is made available to users. Before execution of the stereoscopic presentation program stored on the storage medium, a process for authenticating whether or not the original image that is to be subjected to stereoscopic processing by that stereoscopic presentation program is an original image that is stored on that storage medium (hereinafter, referred to as "authentication process") is executed. Hereinafter, the structure of the device for executing the stereoscopic restriction process with respect to original images (hereinafter, referred to as "authentication image creation device") and the device that performs an authentication process in advance of the stereoscopic processing (hereinafter, referred to as "image processing device") are described separately. As can be understood from the above discussion, the authentication image creation device is a device that is primarily used by the supplier of the storage medium, and the image processing device is a device that is primarily used by users who have obtained that storage medium.

<A-1: Configuration of the Authentication Image Creation Device>

Figure 1:
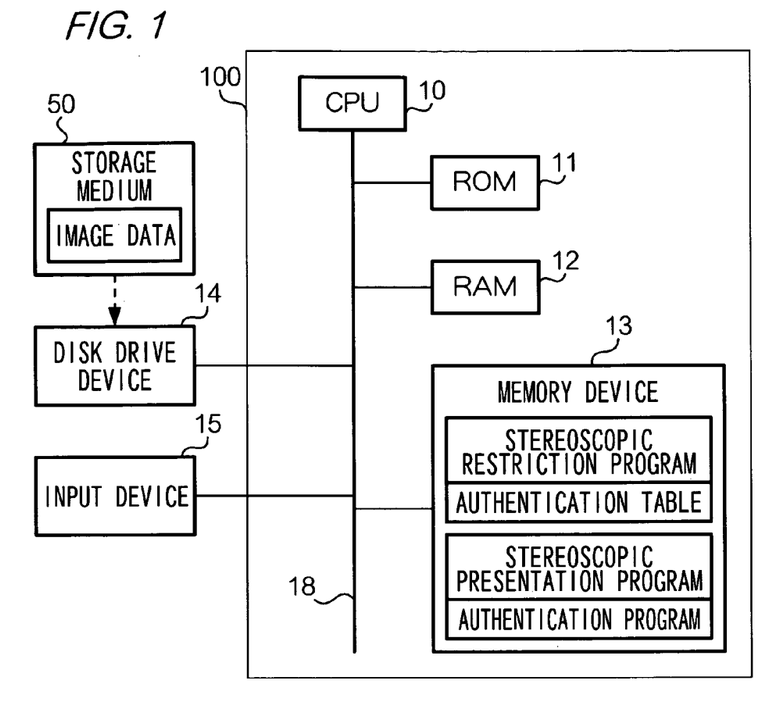
FIG. 1 is a block diagram showing the configuration of an authentication image creation device according an embodiment of the present invention.

FIG. 1 is a block diagram showing the configuration of an authentication image creation device according to an embodiment of the present invention. As shown in this drawing, a device 100 has a CPU (Central Processing Unit) 10 and a ROM (Read Only Memory) 11, a RAM (Random Access Memory) 12 and a memory device 13 that are connected to the CPU 10 through a bus 18. A disk drive device 14 and an input device 15 are connected to the bus 18. As can be seen, the authentication image creation device 100 has the same configuration as a general computer, a typical example being a personal computer.

The CPU 10 is a microprocessor for centrally controlling the various sections of the authentication image creation device 100, and achieves various functions by performing computations and controlling the various sections according to a program. The ROM 11 is a memory for storing the program that is executed by the CPU 10, and the RAM 12 is a memory that is used as a working region by the CPU 10.

Figure 2:
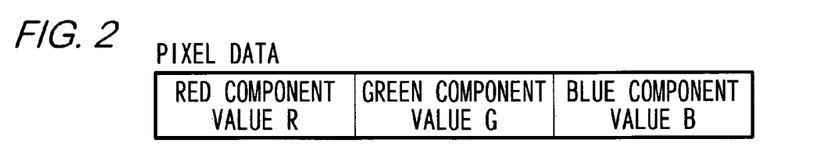
FIG. 2 is a diagram for describing the content of pixel data.

The disk drive device 14 is a device that reads and writes the program and data to and from a storage medium 50. Specifically, a device that drives various types of portable storage medium 50 such as optical disks, typical examples being CDs (Compact Disks) and DVDs (Digital Versatile Disks), magneto-optic disks, or magnetic disks, can be adopted as the disk drive device 14. The storage medium 50 stores data expressing original images (hereinafter, referred to as "image data") prior to stereoscopic restriction process by the authentication image creation device 100. This embodiment assumes a case in which it stores image data for each of the numerous original images (frames) making up a moving image. The image data of a single original image include data (hereinafter, referred to as "pixel data") that indicate the display color of the pixels making up the original image using a RGB display color scheme. That is, as shown in FIG. 2, the pixel data corresponding to a single pixel include a numerical value for the red component, a numerical value for the green component, and a numerical value for the blue component, of the display color of that pixel.

On the other hand, the memory device 13 shown in FIG. 1 is a device that stores the program executed by the CPU 10 and the various data that are used when this program is executed. For example, it is possible to adopt a hard disk device that incorporates a magnetic disk as the memory device 13. The memory device 13 also stores an OS (Operating System) for controlling the overall operation of the authentication image creation device 100, a stereoscopic presentation program, an authentication program, and a stereoscopic restriction program. Of these, the stereoscopic presentation program supplies a function for creating stereoscopic images from original images. Stereoscopic images are images obtained by synthesizing an image that should be viewed by the user's right eye (hereinafter, referred to as "right eye image") and an image that should be viewed by the user's left eye (hereinafter, referred to as "left eye image"). The left eye image and the right eye image have parallax. Consequently, a user who with his right eye views the right eye image and with his left eye views the left eye image accordingly perceives the captured object in that stereoscopic image in three dimensions. On the other hand, the authentication program is a program for authenticating whether or not stereoscopic processing is allowed in the image processing device being used by the user. The stereoscopic presentation program and the authentication program are supplied to the user stored on the storage medium 50 together with the original images.

The stereoscopic restriction program supplies a function for executing stereoscopic restriction process with respect to the original images recorded on the storage medium 50. More specifically, the stereoscopic restriction program supplies a function for specifying a single or multiple pixels, of the original images, to be supplied for authentication in the image processing device (hereinafter, referred to as "target pixels"), and using a predetermined algorithm to specify the numerical values corresponding to the pixel data of the multiple pixels adjacent to the target pixel(s) and then altering the pixel data of the target pixel(s) based on the data expressing these numerical values (hereinafter, referred to as "update data"). The present embodiment assumes a case where stereoscopic restriction process is performed on all of the original images making up a moving image.

Figure 3:
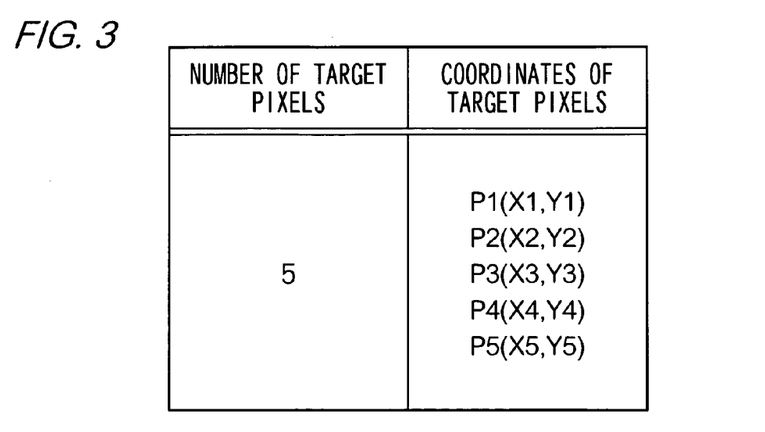
FIG. 3 is a diagram showing the content of the authentication table.

The memory device 13 also stores a table that is used when the stereoscopic restriction program is executed (hereinafter, referred to as "authentication table"). This authentication table is used to specify the number of pixels in the original images that are to be regarded as target pixels and the locations of those target pixels. Specifically, as shown in FIG. 3, the authentication table relates the number of pixels to be regarded as target pixels and the coordinates of the pixels that are to be regarded as target pixels in each original image. Here, the present embodiment assumes a case where all of the original images have common target pixel numbers and coordinates. For example, with the authentication table shown in FIG. 3, the five pixels having the coordinates P1 through P5 are specified as target pixels for all of the original images making up the moving image. This authentication table, like the stereoscopic presentation program and the authentication program discussed above, is supplied to the user stored on the storage medium 50 along with the original images.

The input device 15 shown in FIG. 1 is provided with a pointing device such as a mouse and a keyboard for the input of characters and symbols, and outputs signals corresponding to operations performed by a supplier of the abovementioned programs to the CPU 10. The supplier, by suitably operating the input device 15, can change the elements of the authentication table, that is, the number of target pixels and their coordinates.

<A-2: Operation of the Authentication Image Creation Device 100>

The operation of the present embodiment is described next. When the supplier performs a predetermined operation through the input device 15 to send a command to activate the stereoscopic restriction program, the CPU 10 reads the stereoscopic restriction program and the authentication table stored on the memory device 13 from the memory device 13 to the RAM 12 and then executes that program. The operation of the CPU 10 at this time is described below with reference to FIG. 4.

Figure 4:
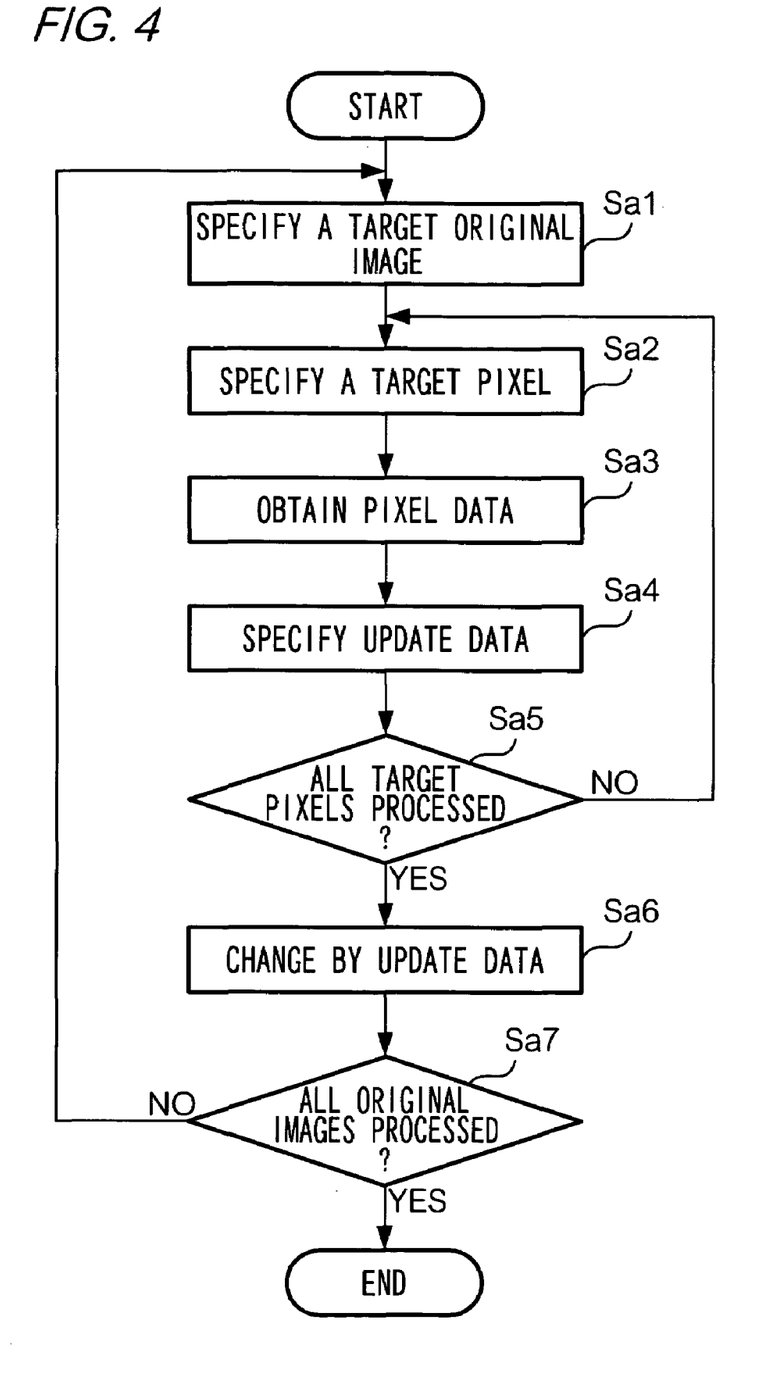
FIG. 4 is a flowchart showing the content of the stereoscopic restriction program.
Figure 5:
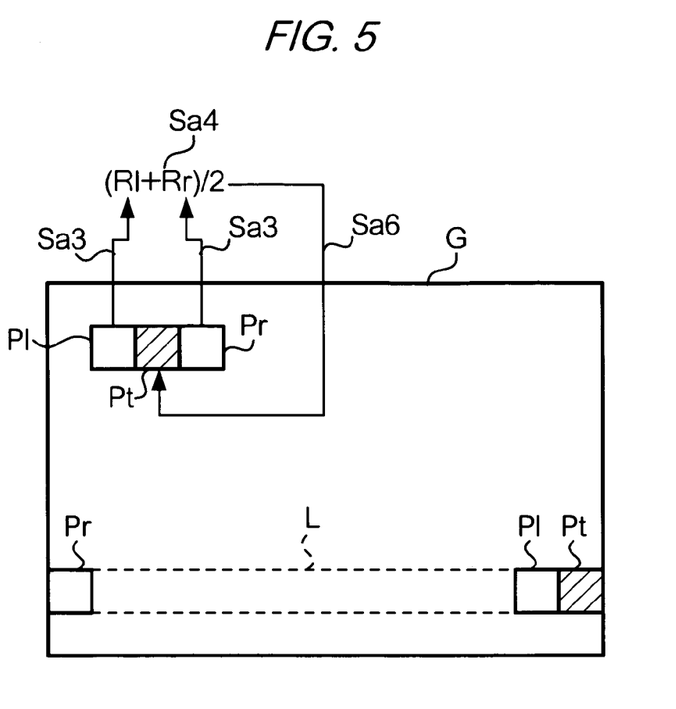
FIG. 5 is a diagram describing the procedure for creating update data.

As shown in FIG. 4, the CPU 10 first specifies the original image of the multiple original images stored on the storage medium 50 that corresponds to the initial image of the moving image (step Sa1). Next, the CPU 10 specifies one target pixel designated by the coordinates in the authentication table (step Sa2). Then, as shown in FIG. 5, the CPU 10 reads the pixel data of the two pixels Pl and Pr, which are adjacent in the left-right direction to the target pixel Pt specified in step Sa2, of the multiple pixels making up the original image G that is specified in step Sa1 from the storage medium 50 (step Sa3). Here, as shown in the bottom right of FIG. 5, a target pixel Pt that is located at the edge of the original image G (that is, at an end of the horizontal line L) may by bordered to only one of the left or right by another pixel Pl. In this case, in step Sa3 the CPU 10 reads the pixel data of a pixel Pr that is on the same line L as the target pixel Pt but that is located on the opposite edge to the target pixel Pt.

The CPU 10 then specifies update data based on the pixel data read in step Sa3 and stores the update data on the RAM 12 (step Sa4). In the present embodiment, as shown in FIG. 5, the mean value of the numerical values of the R component (hereinafter, referred to as "red component value") of the pixel data read in step Sa3 is calculated and the data expressing the numerical value obtained by turning this mean value into an integer are regarded as update data. That is, the numerical value Rc expressed by the update data is obtained by turning into an integer the numerical value obtained by adding the red component value Rl of the pixel Pl located to the left of the target pixel and the red component value Rr of the pixel Pr located to the right of the target pixel and then dividing this value by 2.

Next, the CPU 10 determines whether or not update data have been created for the number of target pixels specified in the authentication table (step Sa5). Here, if it is determined that the number of target pixels for which update data have been created has not yet reached the specified number, then the CPU 10 returns the procedure to step Sa2 and repeats the processing of steps Sa3 through Sa5 after specifying a different target pixel than the previous target pixel based on the coordinates in the authentication table.

Conversely, if it is determined that the number of target pixels for which update data have been created has reached the specified number, then the CPU 10, as shown in FIG. 5, converts the pixel data of the target pixels stored on the storage medium 50 into the update data obtained in step Sa4 for those target pixels (step Sa6).

The CPU 10 then determines whether or not the processing of steps Sa1 through Sa6 has been executed for all of the original images designated in the authentication table (step Sa7). Here, if it is determined that processing has not been completed for all of the original images, then the CPU 10 returns the procedure to step Sa1 and repeats the processing of steps Sa2 to Sa7 after specifying a different original image from the original image targeted immediately prior. As a result, the pixel data of all of the target pixels designed by the authentication table are changed to the update data in all of the original images making up the moving image.

Figure 6:
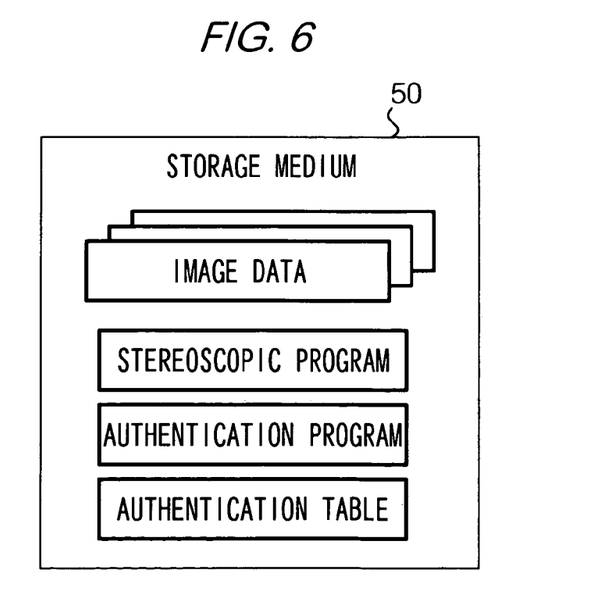
FIG. 6 is a diagram for describing the content stored on the storage medium.

On the other hand, if it is determined in step Sa7 that processing has been completed for all of the original images, then the CPU 10 finishes the stereoscopic restriction process shown in FIG. 4. The CPU 10 subsequently controls the disk drive device 14 to store the stereoscopic presentation program, the authentication program, and the authentication table that are stored on the memory device 13 on the storage medium 50. The information stored on the storage medium 50 that is obtained as a result is shown in FIG. 6. That is, the storage medium 50 stores not only the image data of multiple original images in which the pixel data of the target pixels have been changed to the update data, but also stores the stereoscopic presentation program, the authentication program, and the authentication table. The user who obtains this storage medium 50 can thus view the stereoscopic image that is obtained from the original images by the stereoscopic presentation program stored on the storage medium 50.

<B-1: Configuration of the Image Processing Device>

Figure 7:
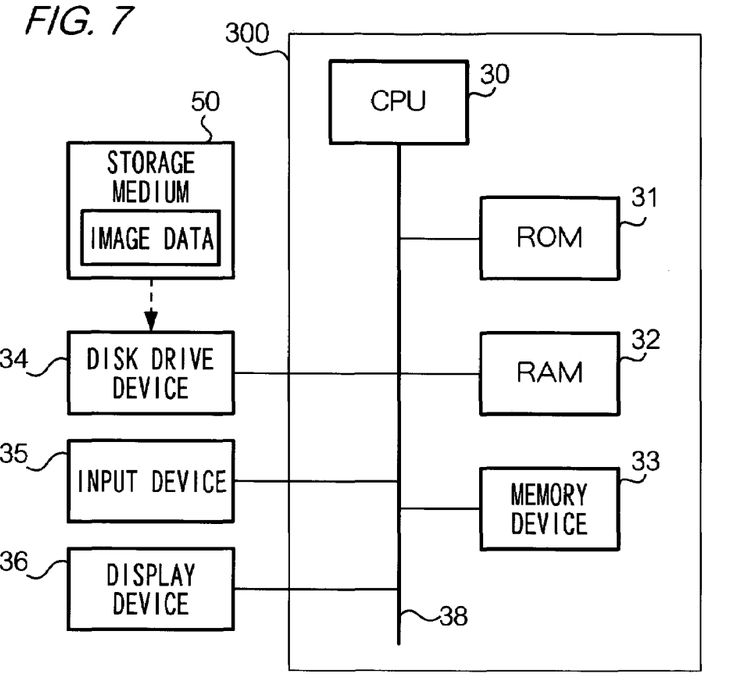
FIG. 7 is a block diagram showing the configuration of an image processing device according to an embodiment of the present invention.

The configuration of an image processing device that is used by the user who has obtained the storage medium 50 is described below with reference to FIG. 7. As shown in the drawing, this device 300 has a CPU (Central Processing Unit) 30 and a ROM (Read Only Memory) 31, a RAM (Random Access Memory) 32 and a memory device 33 that are connected to the CPU 30 through a bus 38. To the bus 38 are connected a disk drive device 34, an input device 35, and a display device 36. Thus, the image processing device 300 has the same configuration as a generalized computer typified by a personal computer.

The CPU 30 is a microprocessor for centrally controlling the various sections of the image processing device 300, and achieves various functions by performing computations and controlling the various sections according to a program. The ROM 31 is a memory for storing the program that is executed by the CPU 30, and the RAM 32 is a memory that is used as a working region by the CPU 30.

The memory device 33 is for example a hard disk device that stores an OS for controlling the overall operation of the image processing device 300. On the other hand, the disk drive device 34 is a drive for reading programs and data from the storage medium 50. The disk drive device 34 differs from the disk drive device 14 of the authentication image creation device 100 in that it is not necessary for it to be capable of writing the program and data to the storage medium 50.

The input device 35, like the input device 15, outputs signals corresponding to operations performed by the user to the CPU 30. By suitably operating the input device 35, the user can give various commands, such as a command for reproducing a moving image stored on the storage medium 50 or activating the stereoscopic presentation program, to the CPU 30.

On the other hand, the display device 36 is provided with a CRT or a liquid crystal display panel and displays various images under control by the CPU 30. The display device 36 of this embodiment is configured in such a manner that it can perform display of a stereoscopic image so that, of the stereoscopic image, the user views the right eye image with his right eye only and views the left eye image with his left eye only. Various configurations have been proposed for allowing the user to perceive such a stereoscopic image, and this embodiment assumes a configuration in which a polarizing filter is employed.

That is, a polarizing film whose polarizing direction is different for the region corresponding to the odd-numbered scan lines and the region corresponding to the even-numbered scan lines counting from the top of the screen is attached to the display surface of the display device 36, and is configured such that the right eye image is displayed by the odd-numbered scan lines and the left eye image is displayed by the even-numbered scan lines. The user views the image that is displayed by the display device 36 through the polarizing film, in which the polarizing direction is different for the right and left eyes. As a result, the user views the right eye image with his right eye only and views the left eye image with his left eye only.

<B-2: Operation of the Image Processing Device 300>

The operation of the image processing device 300 is described next. By the user suitably operating the input device 35 after setting the storage medium 50 that he has obtained in the disk drive device 34, he performs a command for stereoscopic processing of an original image through the stereoscopic presentation program stored on the storage medium 50. When this operation is obtained, the CPU 30 reads the authentication program, the authentication table, and the stereoscopic presentation program stored on the storage medium 50 to the RAM 32 and then consecutively executes the authentication program. The operation of the CPU 30 at this time is described below with reference to FIG. 8.

Figure 8:
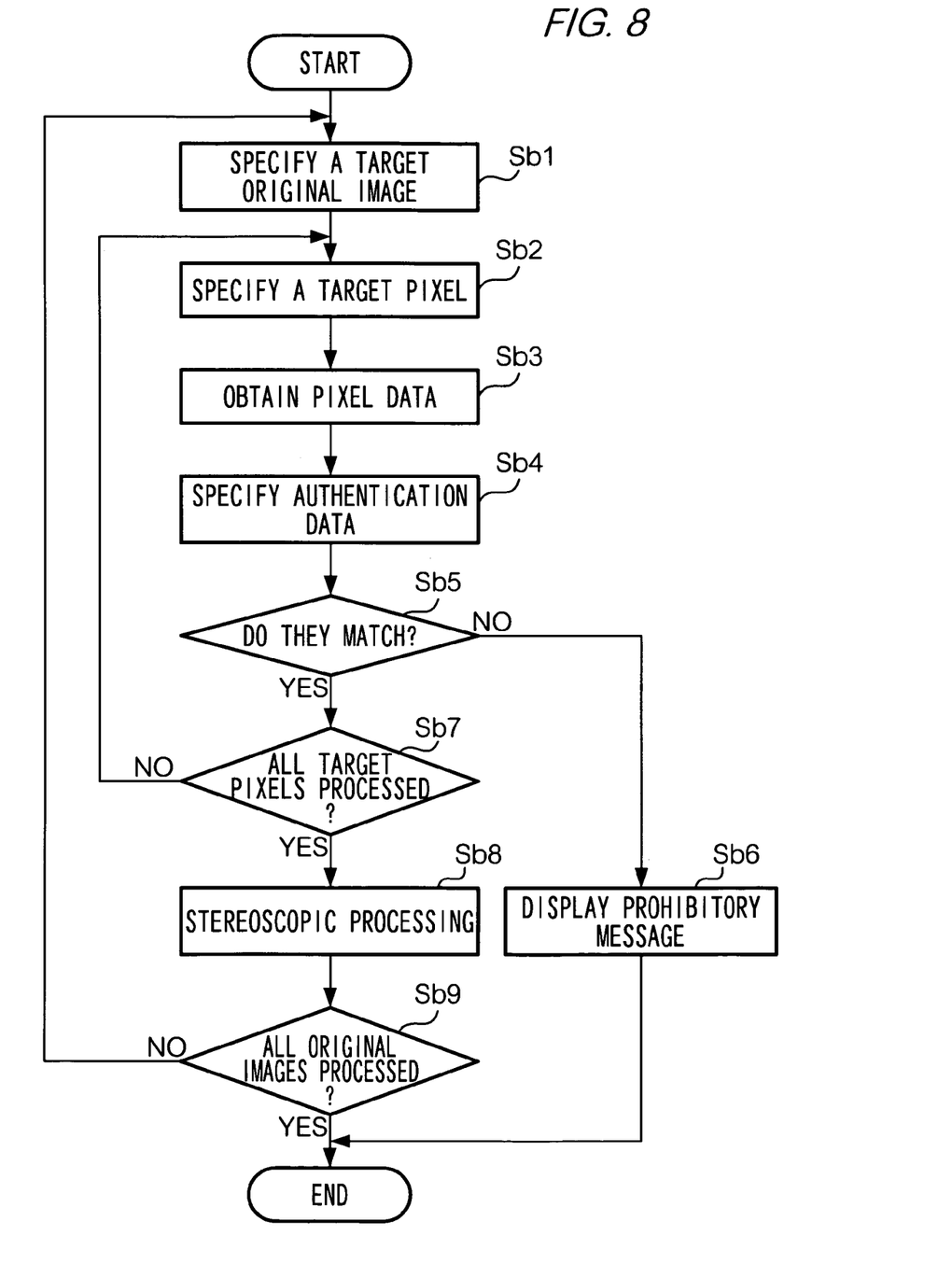
FIG. 8 is a flowchart showing the content of the authentication program.
Figure 9:
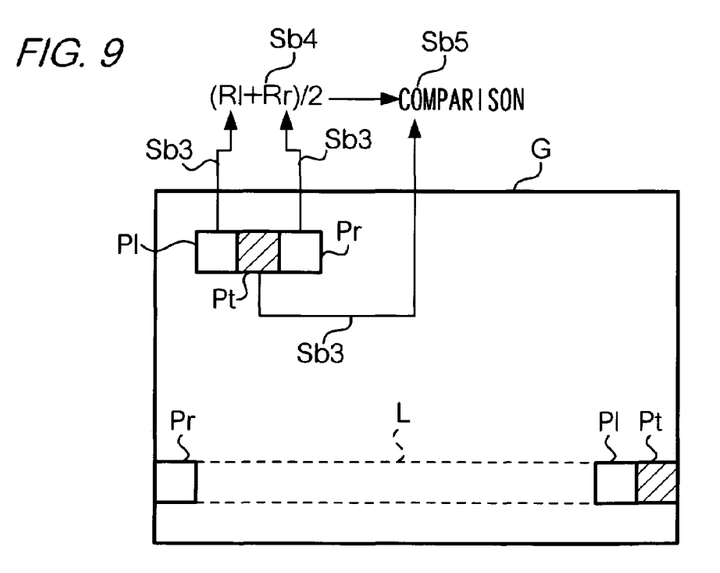
FIG. 9 is a diagram for describing the authentication procedure.

As shown in the drawing, the CPU 30 first specifies the original image, of the multiple original images stored on the storage medium 50, that corresponds to an initial image of a moving image to be reproduced (step Sb1). The CPU 30 then specifies a single target pixel that has been designated by the coordinates included in the authentication table (step Sb2). The CPU 30 then, as shown in FIG. 9, reads the pixel data of the target pixel Pt specified in step Sa2 and the pixel data of the two pixels P1 and Pr that are adjacent to that target pixel Pt in the left-right direction (hereinafter, these are referred to as "adjacent pixels") of the original image G that was specified in step Sa1, and stores these on the RAM 32 (step Sb3). Here, as shown in the bottom right of FIG. 9, if the target pixel Pt is located at an edge of the original image G (that is, at an end of the horizontal line L), then in step Sb2 the CPU 30 reads the pixel data of a pixel Pr that is located on the same line L as the target pixel Pt but on the opposite edge to the target pixel Pt.

Next, the CPU 30 creates authentication data based on the pixel data of the adjacent pixels P1 and Pr that are read out in step Sb2 (step Sb4). More specifically, the CPU 30 creates authentication data through the same procedure as that used to specify update data during stereoscopic restriction process by the authentication image creation device 100 (that is, step Sa4 of FIG. 4). That is, as shown in FIG. 9, the mean value of the red component of the pixel data of the adjacent pixels P1 and Pr is calculated and data that express the numerical value obtained by turning this mean value into an integer are taken as authentication data.

Next, as shown in FIG. 9, the CPU 30 compares the red component value of the pixel data of the target pixel Pt read out in step Sb3 with the numerical value expressed by the authentication data created in step Sb4, and determines if these two are matching (step Sb5). Here, if the original image specified in step Sb1 has been stored on the storage medium 50 after the series of processes shown in FIG. 4, then the red component value of the target pixel and the numerical value of the authentication data should match. Conversely, if the original image specified in step Sb1 has not undergone the processing shown in FIG. 4, that is, if it has been obtained through a route that is different from the storage medium 50, on which the original image is properly provided along with the stereoscopic presentation program, for example, then the red component value of the target pixel and the numerical value of the authentication data will not match. Consequently, if in step Sb5 it is determined that the numerical value is not a match, then the CPU 30 displays a message on the display device 36 that indicates that stereoscopic processing of that original image is not allowed (step Sb6), and ends the procedure shown in FIG. 8.

If it is determined in step Sb5 that the numerical value is a match, then the CPU 30 determines whether or not the determination of step Sb5 has been performed for the number of target pixels designated in the authentication table of the original image specified in step Sb1 (step Sb7). Here, if it is determined that the number of target pixels targeted for determination in step Sb5 has not yet reached the designated number, then the CPU 30 returns the procedure to step Sb2 and repeats the processing of steps Sb3 through Sb7 after specifying a different target pixel than the previous target pixel based on coordinates in the authentication table.

Conversely, if it is determined that the number of target pixels targeted for the determination in step Sb5 has reached the designated number, then the CPU 30 executes the stereoscopic presentation program that has been read to the RAM 32 to stereoscopically process the original image specified in step Sb1 and displays the stereoscopic image obtained as a result on the display device 36 (step Sb8).

Next, the CPU 30 determines whether or not the processing of steps Sb1 through Sb8 has been performed for all of the original images making up the moving image (step Sb9). Here, if it is determined that processing has been completed for all of the original images, then the CPU 30 ends the procedure shown in FIG. 8. Alternatively, if the CPU 30 determines that processing has not been completed for all of the original images, then it returns the procedure to step Sb1 and repeats the processing from step Sb2 onward after specifying a separate original image that follows the original images processed up to that point. The result is that at the moment that it has been determined that the red component value of any of the target pixels does not match the authentication data, the processing shown in FIG. 8 is ended, whereas as long as the two are determined to match (as long as "no" is not the outcome of step Sb5), stereoscopic processing is performed in real time for all of the original images making up the moving image and the moving image is sequentially displayed on the display device 36 as a stereoscopic image.

In this way, in the present embodiment the pixel data of the target pixel of an original image are changed into update data by the authentication image creation device 100. On the other hand, before stereoscopic processing of the original image is started, the image processing device 300 determines whether or not to allow stereoscopic processing of that original image based on the results of comparing the pixel data of the target pixel of the original image with authentication data. Consequently, the present embodiment allows stereoscopic processing by the stereoscopic presentation program stored on the storage medium 50 to be limited to the original images stored onto that storage medium 50.

It should be noted that because authentication data are created from the pixel data of the pixels adjacent to the target pixel, there is the possibility that, depending on the content, the numerical value that is calculated in step Sb4 of FIG. 8 will happen to match the red component value of the target pixel even if the original image has not been through stereoscopic restriction process. Even in this situation, the present embodiment allows suitable determination of whether or not stereoscopic processing of the original image is permitted. That is, in the present embodiment, it is possible to specify multiple original images as targets for authentication and furthermore, to specify multiple pixels in each original image as target pixels. Stereoscopic processing is performed only after a comparison with authentication data has been performed for all of the target pixels. Consequently, even if the red component values of some of the pixels match the numerical values of the authentication data, the result of determination for other target pixels will cause stereoscopic processing to be forbidden.

Also, the larger the disparity between the display color that is expressed by the pixel data before being altered through stereoscopic restriction process and the display color that is expressed by the pixel data after being altered, the more noticeable the effect on the picture quality of the original image. Consequently, in the present embodiment the update data are specified as the mean value of the pixel data of the pixels located near the target pixel, and thus the picture quality of the original image after stereoscopic restriction process can be kept from dropping. This is because, taking into account the fact that in general the display colors of adjacent pixels are approximate, the content of the pixel data of the target pixel can be kept from significantly differing before and after stereoscopic restriction process.

C: MODIFIED EXAMPLES

The embodiment described above is only one illustrative example, and various modifications thereto are possible within a range that does not depart from the gist of the present invention. Specific examples of conceivable modifications are discussed below.

C-1: Modified Example 1

The foregoing embodiment illustratively shows a configuration in which update data and authentication data are specified based on the pixel data of two pixels adjacent to a target pixel, but the number or locations of the pixels used for specifying these data are not limited to this. For example, it is also possible to adopt a configuration in which the mean value of the red component values of four pixels that are adjacent above, below, and to the left and right, of the target pixel is calculated and for update data and authentication data expressing that mean value to be specified. Alternatively, it is also possible to adopt a configuration in which, in addition to the red component values of the two pixels adjacent to the target pixel, the red component value of that target pixel also is included in the computation of the mean value, and update data and authentication data expressing that mean value are specified. That is, through the configuration that is adopted it is only necessary that the update data or the authentication data are specified based on the pixel data of at least one pixel that has been selected according to the positional relationship that it has with the target pixel.

Furthermore, in the foregoing embodiment, the configuration that is shown is one in which the mean value of the red component values are calculated for the pixel data of pixels that are adjacent to the target pixel and the update data and the authentication data are specified as data expressing this mean value, but there is no limitation to this as the method for specifying the update data or the authentication data. For example, it is also possible to adopt a configuration in which the pixel data of a single pixel that is horizontally adjacent to the target pixel itself, or the value that is obtained by adding a predetermined value to that pixel data, are used as the update data or the authentication data of that target pixel. That is, it is only necessary that the update data or the authentication data are specified so as to differ based on the pixel data of at least one pixel, that is, in accordance with the content of the pixel data of at least one pixel.

C-2: Modified Example 2

In the foregoing embodiment and modified example, the configuration that is shown is one in which stereoscopic restriction and authentication are performed on all of the original images making up a moving image, but it is also possible to adopt a configuration in which stereoscopic restriction and authentication are performed on only some of the original images of the multiple original images that make up a moving image. This configuration is achieved by including information for specifying the original images of the moving image that should be targeted for authentication in the authentication table shown in FIG. 3, and in step Sa1 of FIG. 4 and step Sb1 of FIG. 8, by specifying the original images based on this information.

In the foregoing embodiment and modified example, the configuration that is shown is one in which a common pixel serves as the target pixel for all of the original images making up a moving image, but it is also possible to adopt a configuration in which the number of target pixels and their coordinates differ for each original image.

C-3: Modified Example 3

In the foregoing embodiment and modified examples, the configuration is one in which image data are stored on the storage medium 50 in advance of stereoscopic restriction, but it is also possible to adopt a configuration in which the image data are stored on the memory device 13 of the authentication image creation device 100 and then in step Sa8 of FIG. 4 those image data are stored on the storage medium 50 along with the stereoscopic presentation program.

Further, the foregoing embodiment and modified examples assumed a case in which, as shown in FIG. 6, the image data, the stereoscopic presentation program, the authentication program, and the authentication table are made available to the user in a form stored on the storage medium 50, but it is also possible to adopt a configuration in which these programs or data are supplied to the image processing device 300 over a network such as the internet. It is also not necessary for these programs and data to be supplied all at once, and they can also be supplied separately.

The foregoing embodiment and modified examples illustratively show a configuration in which the authentication table has been prepared separate from the authentication program, but it is also possible for the number of target pixels or the coordinates of the target pixels that should be specified by the authentication table (or information identifying the original image that should be targeted for authentication) to be included as variables in the authentication program itself.

That is, it is not absolutely necessary to prepare an authentication table in a format where it is separate from the authentication program. In this case, it is possible to adopt a configuration in which the information for identifying the original image that should be targeted for stereoscopic restriction or the number of target pixels and their coordinates are instructed by the supplier, and the variables of the authentication program are updated in accordance with the content of this instruction, when stereoscopic restriction is to be performed by the stereoscopic restriction program (in advance of step Sa1 in FIG. 4).

C-4: Modified Example 4

The foregoing embodiment and modified examples illustratively show a configuration in which stereoscopic vision is achieved by attaching a polarizing film to the display surface of the display device 36, but there is no limitation to this regarding the method for achieving stereoscopic vision, and any of the various publicly available methods can be used instead. For example, it is also possible to adopt a HMD (Head Mounted Display) method in which the user views separate display surfaces with his left and right eyes or a method which combines a liquid crystal display panel and a lenticular lens. That is, as long as the configuration allows the user to view one of two images having parallax with his left eye and to view the other image with his right eye, the manner of that configuration is not important. Further, any of the various publicly available methods for obtaining a stereoscopic image from an original image can be adopted.

As described above, the present invention allows the target of stereoscopic processing for creating a stereoscopic image from an original image to be restricted to specified original images.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An authentication image creation device comprising:
   memory means that, for each of a plurality of pixels making up an original image, stores pixel data indicating a display color of each pixel;
   update pixel obtaining means that obtains pixel data of at least two pixels of the original image that have been selected according to a positional relationship between the at least two pixels and a target pixel in a specific location of the original image, wherein the at least two pixels and the target pixel are present in the original image;
   update data specifying means that specifies update data for the target pixel based on the pixel data of the at least two pixels obtained by the pixel obtaining means, for an image processing device to subsequently compare the update data against pixel data of a pixel of a target original image, the pixel of the target original image being located in the target original image at a position corresponding to the specific location of the target pixel in the original image, so as to determine, based on the comparison, before creating a stereoscopic image, whether or not to allow stereoscopic processing for creating the stereoscopic image; and data processing means that alters the pixel data of the target pixel stored on the memory means based on the update data specified by the update data specifying means.

2. The authentication image creation device according to claim 1,
wherein the update pixel obtaining means obtains the pixel data of the at least two pixels for each of a plurality of the target pixels included in the original image;
wherein the update data specifying means specifies the update data for each of the plurality of target pixels; and
wherein the data processing means alters the pixel data of each of the plurality of target pixels based on the update data obtained for that target pixel.

3. The authentication image creation device according to claim 1,
wherein one of the at least two pixels of the original image obtained by the update pixel obtaining means is adjacent to the target pixel.

4. The authentication image creation device according to claim 1,
wherein the pixel data of each of the pixels includes numerical values corresponding to the color displayed by that pixel; and
wherein the update data specifying means specifies a mean value of the numerical values included in the pixel data of the at least two pixels obtained by the update pixel obtaining means as the update data.

5. An authentication image creation method of causing a computer that is provided with memory means that, for each of a plurality of pixels making up an original image, stores pixel data indicating a display color of each pixel, to perform:
an update pixel obtaining process of obtaining pixel data of at least two pixels of the original image that have been selected according to a positional relationship between the at least two pixels and a target pixel in a specific location of the original image, wherein the at least two pixels and the target pixel are present in the original image;
an update data specifying process of specifying update data for the target pixel based on the pixel data of the at least two pixels obtained by the update pixel obtaining process, for an image processing device to subsequently compare the update data against pixel data of a pixel of a target original image, the pixel of the target original image being located in the target original image at a position corresponding to the specific location of the target pixel in the original image, in order to determine, based on the comparison, before creating a stereoscopic image, whether or not to allow stereoscopic processing for creating the stereoscopic image; and
a data processing process of altering the pixel data of the target pixel stored on the memory means based on the update data specified in the update data specifying process.

6. An image processing device comprising:
memory means that, for each of a plurality of pixels making up an original image, stores pixel data indicating a display color of each pixel;
authentication pixel obtaining means that obtains pixel data of a target pixel in a specific location of the original image and that obtains pixel data of at least two pixels of the original image that have been selected according to a positional relationship between the at least two pixels and the target pixel, wherein the at least two pixels and the target pixel are present in the original image;
authentication data specifying means that specifies authentication data based on the pixel data of the at least two pixels obtained by the authentication pixel obtaining means; and
determination means that compares the authentication data specified by the authentication data specifying means and the pixel data of the target pixel obtained by the authentication pixel obtaining means, and based on results of this comparison, determines, before creating a stereoscopic image, whether or not to allow stereoscopic processing for creating the stereoscopic image.

7. The image processing device according to claim 6,
wherein the authentication pixel obtaining means obtains the pixel data of the at least two pixels for each of a plurality of the target pixels included in the original image;
wherein the authentication data specifying means specifies the authentication data for each one of the plurality of target pixels; and
wherein for each of the target pixels, the determination means compares the pixel data of that target pixel with the authentication data specified by the authentication data specifying means.

8. The image processing device according to claim 6,
wherein one of the at least two pixels of the original image obtained by the authentication pixel obtaining means is adjacent to the target pixel.

9. The image processing device according to any one of claim 6,
wherein the pixel data of the pixels includes numerical values corresponding to the color displayed by that pixel; and
wherein the authentication data specifying means specifies a mean value of the numerical values in the pixel data of the at least two pixels obtained by the authentication pixel obtaining means as the authentication data.

10. A computer readable storage medium storing a program including instructions for causing a computer to function as:
memory means that, for each of a plurality of pixels making up an original image, stores pixel data indicating a display color of each pixel;
update pixel obtaining means that obtains pixel data of at least two pixels of the original image that have been selected according to a positional relationship between the at least two pixels and a target pixel in a specific location of the original image, wherein the at least two pixels and the target pixel are present in the original image;
update data specifying means that specifies update data for the target pixel based on the pixel data of the at least two pixels obtained by the update pixel obtaining means, for an image processing device to subsequently compare the update data against pixel data of a pixel of a target original image, the pixel of the target original image being located in the target original image at a position corresponding to the specific location of the target pixel in the original image, in order to determine, based on the comparison, before creating a stereoscopic image, whether or not to allow stereoscopic processing for creating the stereoscopic image; and
data processing means that alters the pixel data of the target pixel stored on the memory means based on update data specified by the update data specifying means.

11. A computer-readable storage medium storing a program including instructions for causing a computer to function as:

memory means that, for each of a plurality of pixels making up an original image, stores pixel data indicating a display color of each pixel;

authentication pixel obtaining means that obtains pixel data of a target pixel in a specific location of the original image and that obtains pixel data of at least two pixels of the original image that have been selected according to a positional relationship between the at least two pixels and the target pixel, wherein the at least two pixels and the target pixel are present in the original image;

authentication data specifying means that specifies authentication data based on the pixel data of the at least two pixels obtained by the authentication pixel obtaining means; and determination means that compares authentication data specified by the authentication data specifying means and the pixel data of the target pixel obtained by the authentication pixel obtaining means, and based on results of this comparison, determines, before creating a stereoscopic image, whether or not to allow stereoscopic processing for creating the stereoscopic image.

12. The authentication image creation device of claim 1, wherein the stereoscopic image includes a plurality of images having parallax from the original image.

13. The authentication image creation method of claim 5, wherein the stereoscopic image includes a plurality of images having parallax from the original image.

14. The image processing device of claim 6, wherein the stereoscopic image includes a plurality of images having parallax from the original image.

15. The computer-readable storage medium of claim 10, wherein the stereoscopic image includes a plurality of images having parallax from the original image.

16. The computer-readable storage medium of claim 11, wherein the stereoscopic image includes a plurality of images having parallax from the original image.

* * * * *